(12) United States Patent
Burns et al.

(10) Patent No.: US 12,024,927 B2
(45) Date of Patent: Jul. 2, 2024

(54) LOCKABLE ROLL-UP DOOR ASSEMBLY

(71) Applicant: Hansen International, Inc., Lexington, SC (US)

(72) Inventors: Sean T. Burns, Lexington, SC (US); Jennifer M. Hollis, Lexington, SC (US)

(73) Assignee: Hansen International, Inc., Lexington, SC (US)

( * ) Notice: Subject to any disclaimer, the term of this patent is extended or adjusted under 35 U.S.C. 154(b) by 179 days.

(21) Appl. No.: 17/678,383

(22) Filed: Feb. 23, 2022

(65) Prior Publication Data

US 2023/0265685 A1 Aug. 24, 2023

(51) Int. Cl.
*E05B 65/00* (2006.01)
*B60J 5/08* (2006.01)
*E05B 83/04* (2014.01)

(52) U.S. Cl.
CPC .............. *E05B 65/0021* (2013.01); *B60J 5/08* (2013.01); *E05B 83/04* (2013.01)

(58) Field of Classification Search
CPC .. E05B 65/0894; E05B 65/0021; E05B 83/04; E05B 73/0005; E05B 9/04;
(Continued)

(56) References Cited

U.S. PATENT DOCUMENTS 1,008,533 A * 11/1911 Fletcher ................. E05B 9/084
70/374
1,629,172 A * 5/1927 Murphy ................. E05B 9/084
411/948

(Continued)

FOREIGN PATENT DOCUMENTS

AU 614767 B2 * 9/1988 ......... E05B 63/0065
AU 2009100453 A4 * 6/2009 ............... E05B 9/00
(Continued)

*Primary Examiner* — Kristina R Fulton
*Assistant Examiner* — Steven A Tullia
(74) *Attorney, Agent, or Firm* — JK Intellectual Property Law, PA (57) ABSTRACT

A roll up door assembly is mountable in two tracks laterally spaced from one another, each track including a catch, the roll up door assembly including a door sized to be mountable and slidable along the tracks between a closed position and an opened position, the door being a roll up door including a plurality of slats extending between the tracks, one of the slats being a locking slat having an outer surface and an inner surface and defining a passage therethrough between the outer surface and the inner surface. A housing is attached to the outer surface of the locking slat, the housing defining an opening therethrough aligned with the passage. A key cylinder extends through the passage and the opening. A two-point latching assembly has two latches for selectively engaging the catches and is rotatably driven by a rear portion of the key cylinder adjacent the inner surface of the locking slat. A fixing member threadedly engages an outer surface of the key cylinder to secure the key cylinder to the housing, the fixing member being annular and being configured with the housing and the locking slat so that the fixing member has an axial length at least as long as a distance between an inner surface of the housing and the outer surface of the locking slat when the fixing member is positioned to secure the key cylinder to the housing.

19 Claims, 7 Drawing Sheets

(58) Field of Classification Search
CPC . E05B 9/08; E05B 9/084; E05B 9/086; E05B 63/0017; E05B 63/14; E05B 63/146; E05B 65/006; E05B 65/0075; E05B 65/44; E05B 65/46; E05B 65/463; E05B 65/468; E05B 65/52; E05B 65/5215; E05B 65/523; E05B 65/5238; B60J 5/08; E05C 9/047; E05C 9/043
USPC .................................................. 70/95
See application file for complete search history.

(56) References Cited

U.S. PATENT DOCUMENTS

| | | | | |
|---|---|---|---|---|
| 1,955,439 | A * | 4/1934 | Robinson | E05B 65/0021 70/129 |
| 1,990,794 | A * | 2/1935 | McCormac | E05B 9/086 70/375 |
| 2,427,909 | A * | 9/1947 | Howell | E05C 9/048 70/216 |
| 2,612,396 | A * | 9/1952 | Venditty | E05B 65/0021 16/72 |
| 3,187,526 | A * | 6/1965 | Moler | E05C 9/043 292/7 |
| 3,745,795 | A * | 7/1973 | Sanders | E05B 9/084 70/451 |
| 3,838,877 | A * | 10/1974 | Hanson | E05B 65/0021 292/DIG. 36 |
| 3,899,907 | A * | 8/1975 | Prahl | E05B 9/084 70/451 |
| 3,903,718 | A * | 9/1975 | Fish | E05B 63/14 70/299 |
| 4,338,806 | A * | 7/1982 | Cox | E05B 63/006 70/417 |
| 4,633,690 | A * | 1/1987 | Foshee | E05B 9/084 70/451 |
| 4,704,880 | A * | 11/1987 | Schlindwein | E05C 9/047 70/120 |
| 4,708,007 | A * | 11/1987 | Stoia | E05B 9/08 D8/352 |
| 5,024,070 | A * | 6/1991 | Toledo | E05B 9/084 49/141 |
| 5,193,370 | A * | 3/1993 | Norden | E05C 9/047 70/120 |
| 5,489,130 | A * | 2/1996 | Clark | E05B 65/0021 292/DIG. 36 |
| 6,022,067 | A * | 2/2000 | Hargett | B60J 5/08 296/186.2 |
| 6,085,825 | A * | 7/2000 | Swink | E05F 15/67 160/133 |
| 9,416,810 | B2 * | 8/2016 | Swinderman | B25B 23/12 |
| 9,725,947 | B2 * | 8/2017 | Seehof | B60J 5/08 |
| 10,316,555 | B2 * | 6/2019 | Stephens | E05B 65/0021 |
| 10,808,425 | B2 * | 10/2020 | Snell | E05B 65/0876 |
| 11,578,516 | B2 * | 2/2023 | Burns | E05B 13/002 |
| 2002/0026817 | A1 * | 3/2002 | Greer | E05B 9/084 70/370 |
| 2004/0207211 | A1 * | 10/2004 | Jeffries | E05B 65/0021 292/215 |
| 2010/0043506 | A1 * | 2/2010 | Stendal | E05B 65/0021 70/95 |
| 2013/0081435 | A1 * | 4/2013 | Carey | E05C 9/06 70/344 |
| 2015/0135782 | A1 * | 5/2015 | Sadler | E05C 3/30 70/344 |
| 2018/0209181 | A1 * | 7/2018 | Schroeder | E05B 79/06 |
| 2020/0071974 | A1 * | 3/2020 | Burns | E06B 9/15 |
| 2022/0118833 | A1 * | 4/2022 | Bennett | E06B 9/13 |
| 2022/0396997 | A1 * | 12/2022 | Zarbeck | E06B 9/17046 |
| 2023/0265685 | A1 * | 8/2023 | Burns | B60J 5/08 70/95 |

FOREIGN PATENT DOCUMENTS

| | | | | |
|---|---|---|---|---|
| CN | 101027453 | A * | 8/2007 | ......... E05B 1/0092 |
| DE | 20202312 | U1 * | 11/2002 | ........ E05B 65/0021 |
| DE | 10313429 | A1 * | 10/2004 | ........ E05B 17/2034 |
| DE | 202008008518 | U1 * | 10/2008 | ............... B60J 5/08 |
| DE | 102013019558 | A1 * | 5/2015 | ........... E05B 15/004 |
| DE | 202015102673 | U1 * | 8/2016 | ........ E05B 15/1635 |
| EP | 1236851 | A2 * | 9/2002 | ............. E05B 47/02 |
| EP | 2017407 | A2 * | 1/2009 | ........... E05B 35/008 |
| EP | 3109385 | A1 * | 12/2016 | ........... E05B 63/248 |
| EP | 3524764 | A1 * | 8/2019 | ........ E05B 63/0073 |
| ES | 2369187 | A1 * | 11/2011 | ........ E05B 65/0021 |
| FR | 2547856 | A1 * | 6/1983 | |
| IL | 282961 | A * | 6/2021 | ........ E05B 47/0012 |
| WO | WO-0050704 | A1 * | 8/2000 | ............... B60J 5/12 |

* cited by examiner

LOCKABLE ROLL-UP DOOR ASSEMBLY

TECHNICAL FIELD

The present disclosure relates generally to a lockable roll-up door assembly.

BACKGROUND

Fire, rescue, and commercial vehicles often have numerous compartments for carrying equipment. Such compartments with doors, lids, covers, or the like typically have a latching assembly to allow them to be secured and held in a closed position or unsecured and moved to an opened position. Many of such latching assemblies and/or the doors themselves include some sort of locking mechanism.

Existing roll-up door locking mechanisms include key cylinders mounted to a portion of the door, for example a hard plastic locking block attached to the front side of a metal slat of the door by screws tightened from the back side of the metal slat. The key cylinder extends through aligned openings in the locking block and the metal slat. The openings are intentionally made only slightly larger than the outer diameter of the key cylinder to maintain the strength of the resulting assembly, with the opening in the metal slat having a larger diameter than that of the locking block, for the reason described below. Use of a locking block (as opposed to mounting the key cylinder directly to the metal slat of the door) provides some strength and weatherproofing protection for the key cylinder and the opening in the slat, and provides some front-back space for mounting of the key cylinder and the attached hardware driven by the turning of the key. However, typical key cylinders are so small (axially, in an outside to inside direction), that a cast cam driven by the key cylinder (or equivalent member) is typically mounted to a rear side of such cylinder to provide some inwardly-extending structure to which the latching mechanisms are attached, to provide clearance between the rear of the metal slat and the latching mechanisms.

Typically, a flange encircles the key cylinder on the outer side (the side from which a key is inserted), the flange being larger in diameter than the opening into which the key cylinder is mounted, again, typically in the locking block. Also typically, conventional OD threading is provided on the key cylinder for receiving a conventional threaded nut, so that tightening of the nut secures the key cylinder to the locking block by compressing a part of the locking block around the opening therein between the flange and the nut. However, it can be quite difficult to reach and tighten the nut from the rear of the metal slat, through the opening provided through the metal slat. On one hand, enlarging the opening in the slat to be, for example, twice the diameter of the key cylinder might make the nut easier to attach. However, doing so would negatively decrease the strength of the slat on which the key cylinder is mounted.

This mounting difficulty can be multiplied if codeable key cylinders are to be employed with the existing nut-based mount. Such codeable key cylinders (which can be set to have tumblers match a desired key profile) may be larger in diameter and/or axial length than a corresponding non-codeable key cylinder, making mounting more difficult.

While currently available lockable roll-up door assemblies generally function well for their intended purposes, an assembly addressing one or more of the above issues, and/or providing other benefits, would be welcome.

SUMMARY

According to certain aspects of the disclosure, a roll up door assembly is disclosed which is mountable in two tracks laterally spaced from one another, each track including a catch, the roll up door assembly including, for example, a door sized to be mountable and slidable along the tracks between a closed position and an opened position, the door being a roll up door including a plurality of slats extending between the tracks, one of the slats being a locking slat having an outer surface and an inner surface and defining a passage therethrough between the outer surface and the inner surface. A latching assembly is attached to the locking slat proximate the inner surface, the latching assembly including a two-point latching system having a rotatable member and two latching members attached to the rotatable member for selectively engaging the catches, the two-point latching system being movable between a latching position and an unlatching position. A key cylinder is mounted to the locking slat so as to extend through the passage, the key cylinder having a key opening on an outside of the door and being connected to the rotatable member on an inside of the door, the key cylinder selectively rotatable in a first direction and a second direction, the rotatable member of the two-point latching system rotatable with the key cylinder in the first direction to move the latching members from the unlatching position to the latching position, the rotatable member of the two-point latching system movable via rotation of the key cylinder in the second direction to move the latching members from the latching position to the unlatching position. A mounting assembly includes a housing and a fixing member, the housing being secured to an outside of the locking slat and defining an opening therethrough aligned with the passage, the key cylinder extending through the opening and the passage, the housing defining a first surface on an outer side of the opening and a second surface on an inner side of the opening. The fixing member threadedly engages the key cylinder and the second surface of the housing and fixing a flange portion of the key cylinder against the first surface of the housing to secure the key cylinder to the housing. The fixing member, the housing, and the locking slat are configured so that the fixing member has an axial length at least as long as a distance between the second surface of the housing and the outer surface of the locking slat when the fixing member is positioned to secure the key cylinder to the housing. Various options and modifications are possible.

For example, the fixing member may have an axial length at least as long as a distance between the second surface of the housing and the inner surface of the locking slat when the fixing member is positioned to secure the key cylinder to the housing. Also, the fixing member may have an axial length equal to a distance between the second surface of the housing and the inner surface of the locking slat when the fixing member is positioned to secure the key cylinder to the housing.

The fixing member may be generally annular from front to rear but may have a rear surface configured non-annularly for drivingly receiving a tool for rotating the fixing member relative to the key cylinder to secure the key cylinder to the housing. If so, the rear surface of the fixing member may define two axially-extending slots. The key cylinder may include external threading and the fixing member may include internal threading mating with the external threading of the key cylinder.

The rotatable member may include an opening therethrough for drivingly receiving a protrusion extending from a rear of the key cylinder. A clip may be mounted in a slot in the protrusion for axially securing the rotatable member to the protrusion.

The roll up door assembly may include the tracks and the catches. The latching assembly may include two rods, each of the rods being attached to the rotatable member and being attached to a respective one of the latches, each of the latches extendable into a respective one of the catches when the door is in a closed position and the latches are in the latching position. The key cylinder may be a codeable key cylinder.

According to certain other aspects of the disclosure, a roll up door assembly is disclosed which is mountable in two tracks laterally spaced from one another, each track including a catch, the roll up door assembly including for example, a door sized to be mountable and slidable along the tracks between a closed position and an opened position, the door being a roll up door including a plurality of slats extending between the tracks, one of the slats being a locking slat having an outer surface and an inner surface and defining a passage therethrough between the outer surface and the inner surface. A housing may be attached to the outer surface of the locking slat, the housing defining an opening therethrough aligned with the passage. A key cylinder may extend through the passage and the opening. A two-point latching assembly may be provided having two latches for selectively engaging the catches and rotatably driven by a rear portion of the key cylinder adjacent the inner surface of the locking slat. A fixing member may threadedly engage an outer surface of the key cylinder to secure the key cylinder to the housing. The fixing member may be annular and may be configured with the housing and the locking slat so that the fixing member has an axial length at least as long as a distance between an inner surface of the housing and the outer surface of the locking slat when the fixing member is positioned to secure the key cylinder to the housing. Again, various options and modifications are possible.

For example, the fixing member may have an axial length at least as long as a distance between the inner surface of the housing and the inner surface of the locking slat when the fixing member is positioned to secure the key cylinder to the housing. Also, the fixing member may have an axial length equal to a distance between the inner surface of the housing and the inner surface of the locking slat when the fixing member is positioned to secure the key cylinder to the housing.

The fixing member may be generally annular from front to rear but may have a rear surface configured non-annularly for drivingly receiving a tool for rotating the fixing member relative to the key cylinder to secure the key cylinder to the housing. If so, the rear surface of the fixing member may define two axially-extending slots.

A clip may be mounted in a slot in a protrusion at the rear of the key cylinder axially securing a rotatable member of the two-point latching assembly to the protrusion. The roll up door assembly may include the tracks and the catches. The two-point latching assembly may include two rods, each of the rods being attached to a rotatable member rotatable with the key cylinder and being attached to a respective one of the latches, each of the latches extendable into a respective one of the catches when the door is in a closed position and the latches are in the latching position. The key cylinder may be a codeable key cylinder.

BRIEF DESCRIPTION OF THE DRAWINGS

More details of the present disclosure are set forth in the drawings.

DETAILED DESCRIPTION

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment. Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

Figure 1:
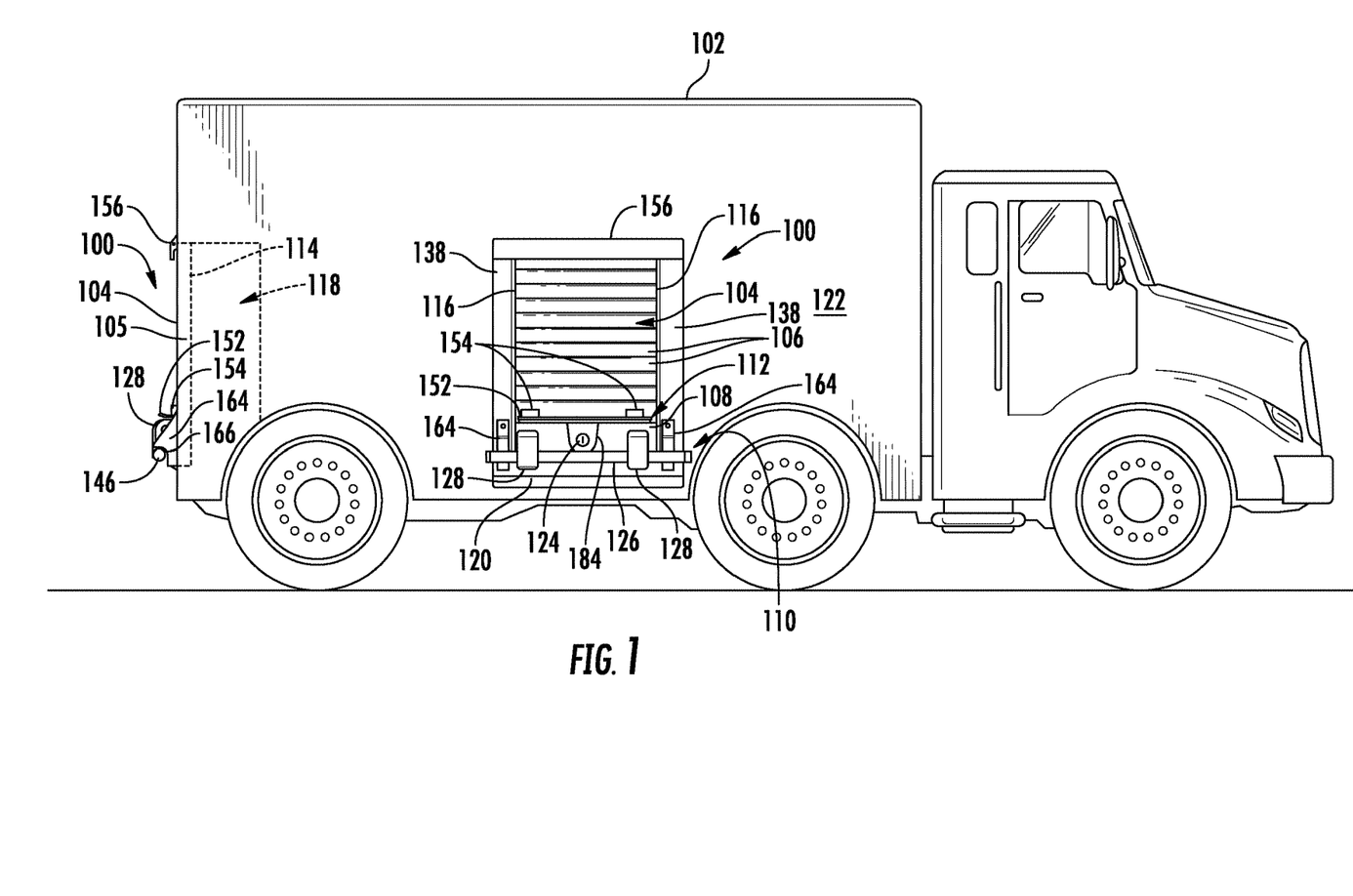
FIG. 1 is a side view of a vehicle showing locations of doors and certain aspects of the roll up door assemblies according to the present disclosure.
Figure 2:
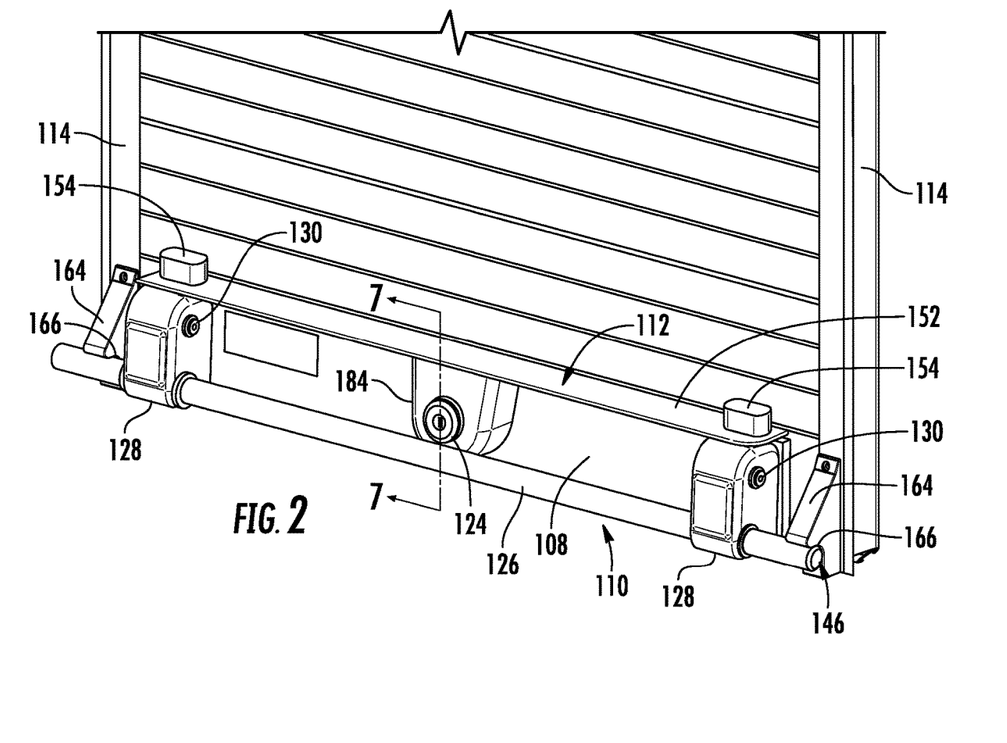
FIG. 2 is an isometric close-up view of the outer bottom portion of a roll up door and its frame, including the location of the key cylinder as mounted on the locking slat.
Figure 3:
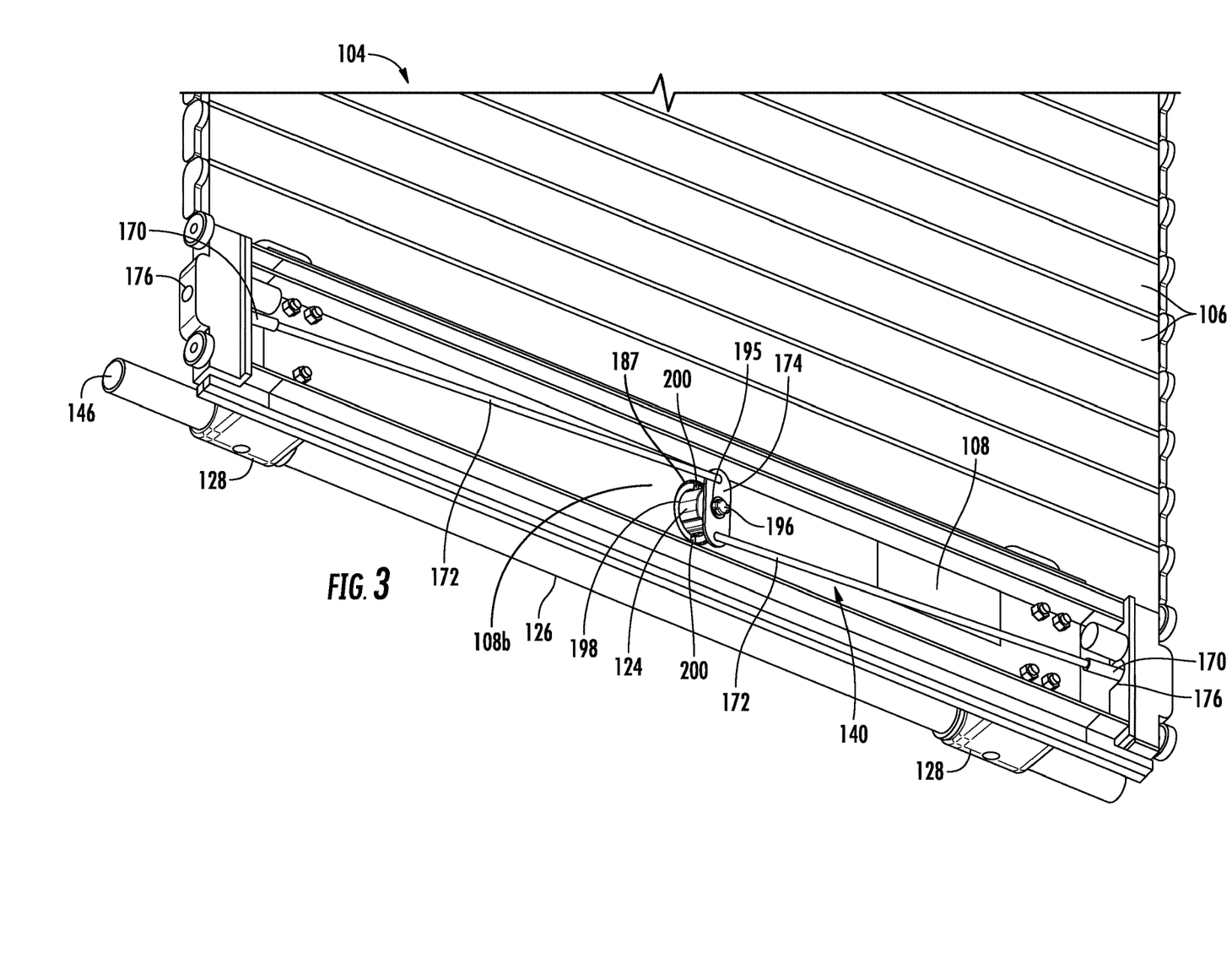
FIG. 3 is an isometric close-up view of the inner bottom portion of the roll up door as in FIG. 2, without the frame, and without a rear slat cover (for clarity).

As illustrated in FIGS. 1, two roll up door assemblies 100 are mounted to an exemplary schematic vehicle 102, which could be a fire, rescue, commercial or other type of vehicle. Each door assembly 100 includes a door 104 having a plurality of joined slats 106 for closing an opening 105. Bottom slat 108 (also called a locking slat herein) is generally larger and may include handles 110 and/or 112, as discussed below. Slats 106 and 108 ride in tracks 114 which are part of a door frame. Sealing members 116 may be provided on sides of door assembly 100 to keep dirt and moisture out of tracks 114 and the compartment 118 covered by door assembly 100. The bottom of door opening 105 may include a sill 120, which may be flush with outer walls 122 of vehicle 102 (as shown).

Handle 110 may be a pivotal handle assembly including a member such as a bar 126 pivotally mounted to slat 108 via pivot blocks 128. Axles 130 through blocks 128 are attached to slat 108 via mounts (not visible) to allow the pivoting. Bar 126 may be an extrusion, and may have a cavity (not shown) at least in part of its length, for example between blocks 128, to receive a lighting element (not shown), which could be a strip light including one or more lighting members such as incandescent, fluorescent, or LED's. The lighting element may cast light as desired downward, toward the vehicle outer wall 122 for lighting the compartment 118 (when door 104 is opened) or for lighting by reflection an area adjacent vehicle 100 (when door 104 is closed). End caps 146 may cover ends of the bar so as to protect the lighting element in the cavity.

Retaining elements 164 may be mounted to frame 138 or outer walls 122, each retaining element having a cavity 166 shaped for releasably securing bar 126 with a friction fit to maintain door 104 in a closed position. If bar 126 and pivot blocks 128 are pivoted outward and upward around axles 130, bar 126 is clear of cavities 166 of retaining elements 164, and door 104 can thus be raised by pulling upward on bar 126. Also or alternatively, to open or close the door, a fixed handle 112 may be provided. Handle 112 can be extruded as part of slat 106 or the bottom slat 108, or may be attached to either. As shown, handle 112 includes a plate-like member 152 attached to a top of bottom slat 108. Bumpers 154, which may be flexible rubber, plastic or the like, may be provided for contacting a top sill 156.

The above describes characteristics of some conventional roll up doors. It should be understood that such door description is exemplary, and other roll up door designs are possible within the scope of this disclosure. It should be understood that, as used herein and in claims below, "door" means any movable closure member, including but not limited to a horizontally or vertically hinged door, a slidable door, a rollup door, etc. Door 104 could also mean a lid or cover of a compartment, tool box, etc. Compartment 118 may be a portion of a vehicle such as an internal or external tool compartment, a passenger compartment, a trunk area, etc. formed as part of or integral with a vehicle body. Compartment 118 may also be an element that may be added to a vehicle such as a job box attached to a vehicle body. Compartment 118 may also be a standalone compartment of a building or other (non-vehicular) structure, such as a shed, walk-in cooler, or any other door of a structure. Frame 138 may thus include portions of an internal or external body of a vehicle, a portion of a storage box, a portion of a building or structure, etc. Opening 105 is the area selectively closable by moving door 104 between a closed position and an opened position to allow access to interior of compartment 118. It should thus be understood that the disclosure and claiming of a door, frame, opening, and compartment herein are to be broadly interpreted and not limited to the examples shown.

Other details of the roll up door assembly allow for a secure and reliable mounting and use of its key cylinder, its mounting elements, and/or a two-point latching system including same.

FIGS. 3-6 and 8 show a substantial portion of elements viewed from an interior side of door 104 with usual a rear/inside cover present at a back of locking slat removed for clarity. (See location of removable cover 134 held in recesses 136 of locking slat 108 in FIG. 7). As shown, a basic two-point latching assembly 140 is located on an inside of door 104. Latching assembly 140 may be operated via key cylinder 124 from the outside of door 104. As illustrated, latching assembly 140 includes a two-point latching configuration with a latch 170 located on both lateral sides of door 104, but it would be possible to employ a one-point latch configuration with only one latch 170 if desired. Each latch 170 is connected via a rod 172 to a rotatable element 174 mounted for rotation with key cylinder 124. Rods 172 may incorporate a bend and may extend through element 174 or may be retained by a clip (not shown), or may include another mechanism allowing rotational connection to element 174.

Latch 170 may be a reinforced bar, a thickened portion of rod, a square or hex or other shaped element, whether uniformly formed or attached to rod. Alternatively, latch 170 may simply be an end portion of rod 172 without substantial difference in cross-sectional shape or thickness. Also, latch 170 may be movable relative to rod 172 (such as a pivotable, slidable, etc.), and may be spring biased toward an extended or retracted position, to then be moved via rod 172 and/or an intervening mechanism (not shown). The basic latch and/or connection to the key cylinder may be modified to make the latches and doors slammable, and/or openable from the inside or by another mechanism, if desired. Thus, the two-point latching mechanism mentioned and claimed herein would incorporate any of those designs and functions.

Figure 4:
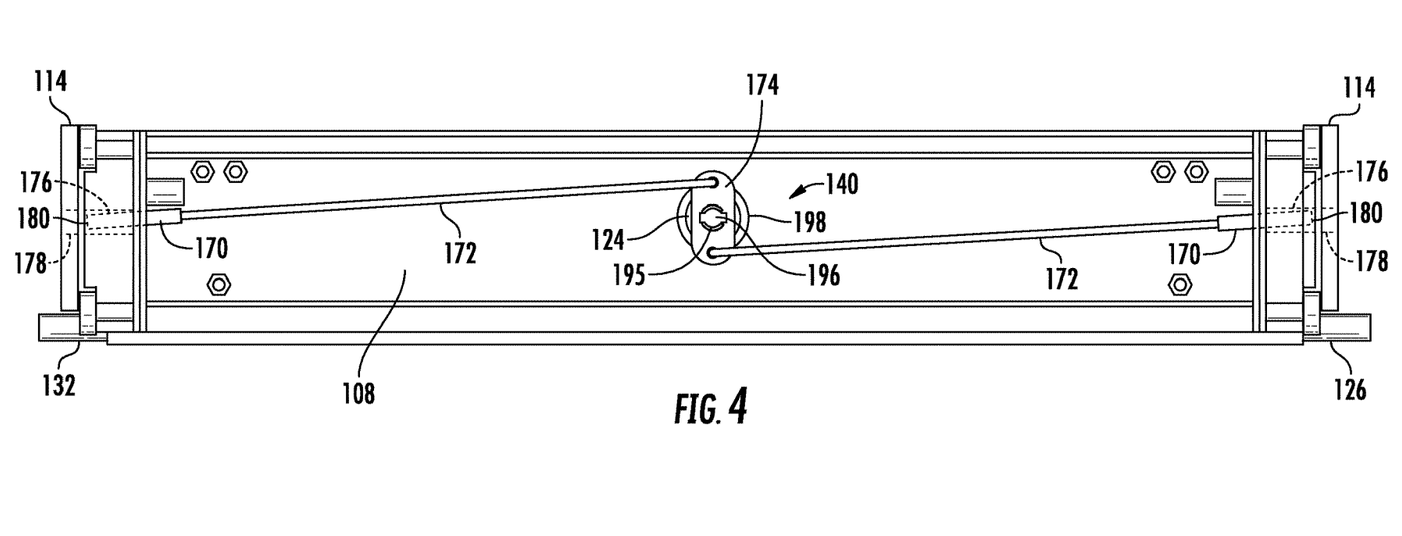
FIG. 4 is a rear view of the locking slat of the roll up door with the slat cover removed and showing the two-point latching assembly with the latches in an unlatched position.

As illustrated, in the position of FIG. 4 latches 170 are retracted sufficiently so that ends 180 are within openings 176 in bottom slat 108, and door 104 may slide up and down within tracks 114 unimpeded by latches 170. Rotation of element 174 to the position of FIG. 5 causes latches 170 to extend from openings 176. If door is in the closed position and element 174 is so rotated, ends 180 of latches 170 will extend into openings 178 in tracks 114 aligned with openings 176 in bottom slat 108. In such position, latches 170 are in the latching position and door 104 is secured in the closed position. If latches 170 are retracted as in FIG. 4, the latches are in an unlatching position, and door 104 is not secured by the latches because the latches are retracted back from openings 178 in tracks 114, thereby permitting the door to freely move up or down in the tracks.

Figure 5:
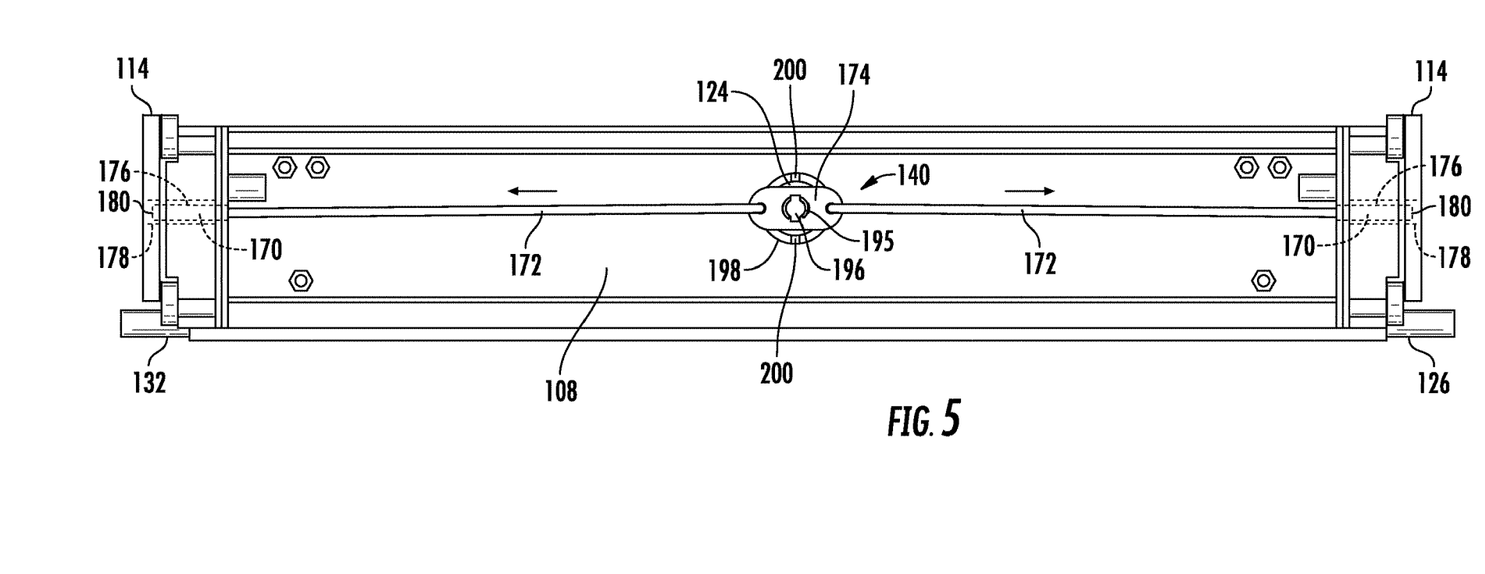
FIG. 5 is a rear view as in FIG. 4, but with the latches in a latched position.

Coil or compression springs may be provided to bias element 174 in a rotational direction and/or rods 172 and latches 174 in a linear direction to urge latches 170 toward the latched position of FIG. 5 or the unlatched positon of FIG. 4. Openings 178 may be replaced by another fixed structure, such as a shoulder, flange, plate, rod, etc. attached to or extending from tracks 114 or walls 122 for contacting latches 170 and preventing movement of door upward when latched. Further, openings 178 could be replaced by movable structures, such as electronic (e.g., servo-controlled) locking mechanisms, or other movable locking mechanisms for selectively locating a structure in a position such that it contacts and prevents latch 170 from moving past the structure and therefore maintains the door in a closed position.

Two-point latching assembly 140 may be moved between the position of FIG. 4 and the position of FIG. 5 via use of key cylinder 124 (from outside of door 104. Key cylinder 124 may drive rotatable element 174 via one of several possible lost-motion actions (i.e., via what is commonly called a "lazy cam") or a fixed drive (with no lost motion). Accordingly, in some ways, rotatable element 174 is like a bolt driven by key cylinder 124, with the bolt being attached to one or more latches 170 via rods 172.

Rotatable element 174 may be mounted via an opening 194 to cam drive 196 of key cylinder 124. A clip 195 slid into slot 197 in cam drive 196 may axially secure rotatable element 174 to cam drive 196. Mating shapes between opening 194 and cam drive 196 may secure rotatable element 174 against rotation relative to came drive 196 and therefore lock the rotatable element for rotation only with as permitted by key cylinder 124. Opening 194 and cam drive 196 may be configured such that more than one relative attachment orientation is possible (note generally cross-shaped opening 194 can receive generally rod shaped cam-drive 196 in two, perpendicular orientations). Such mounting alternatives can provide useful options to meet particular arrangements, sizes, and opening and closing functionality desired for various door and compartment installations.

Figure 6:
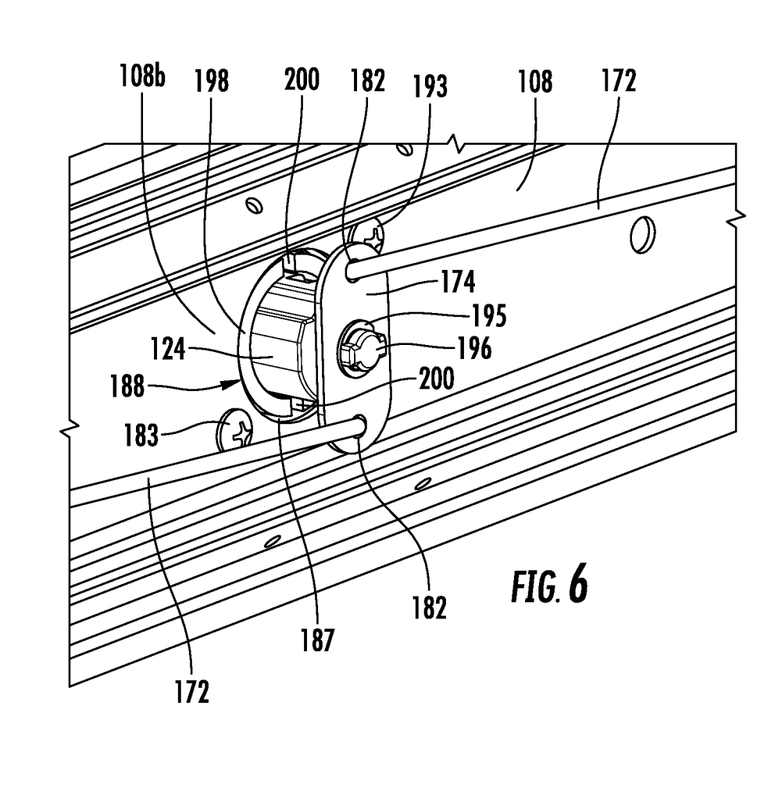
FIG. 6 is a rear perspective view of a portion of the locking slat at the key cylinder.
Figure 7:
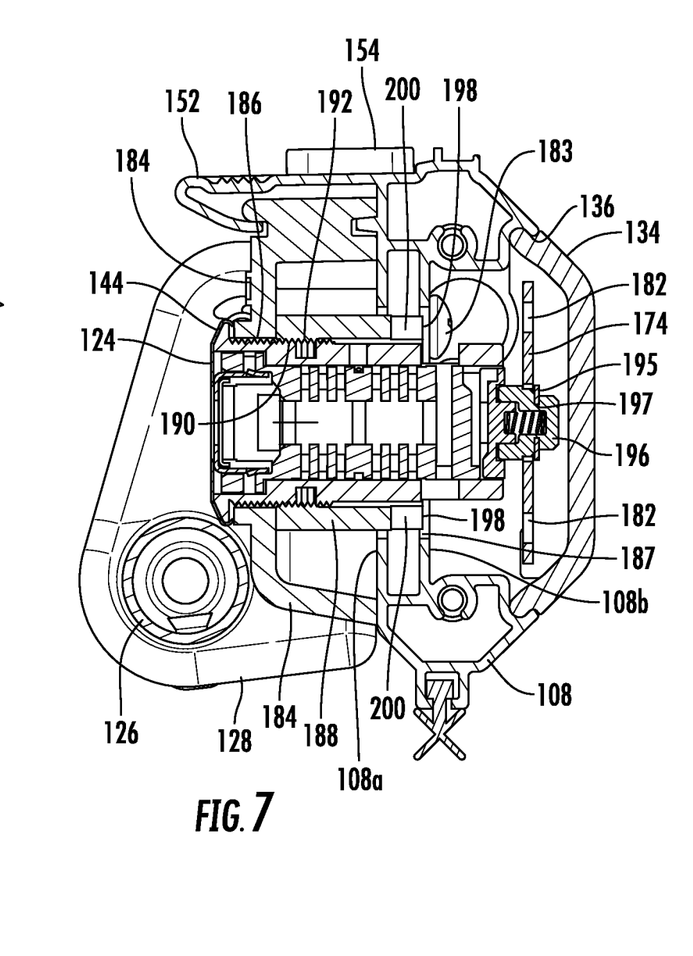
FIG. 7 is a cross-sectional view through the locking slat at the key cylinder, taken along lines 7-7 of FIG. 2.
Figure 8:
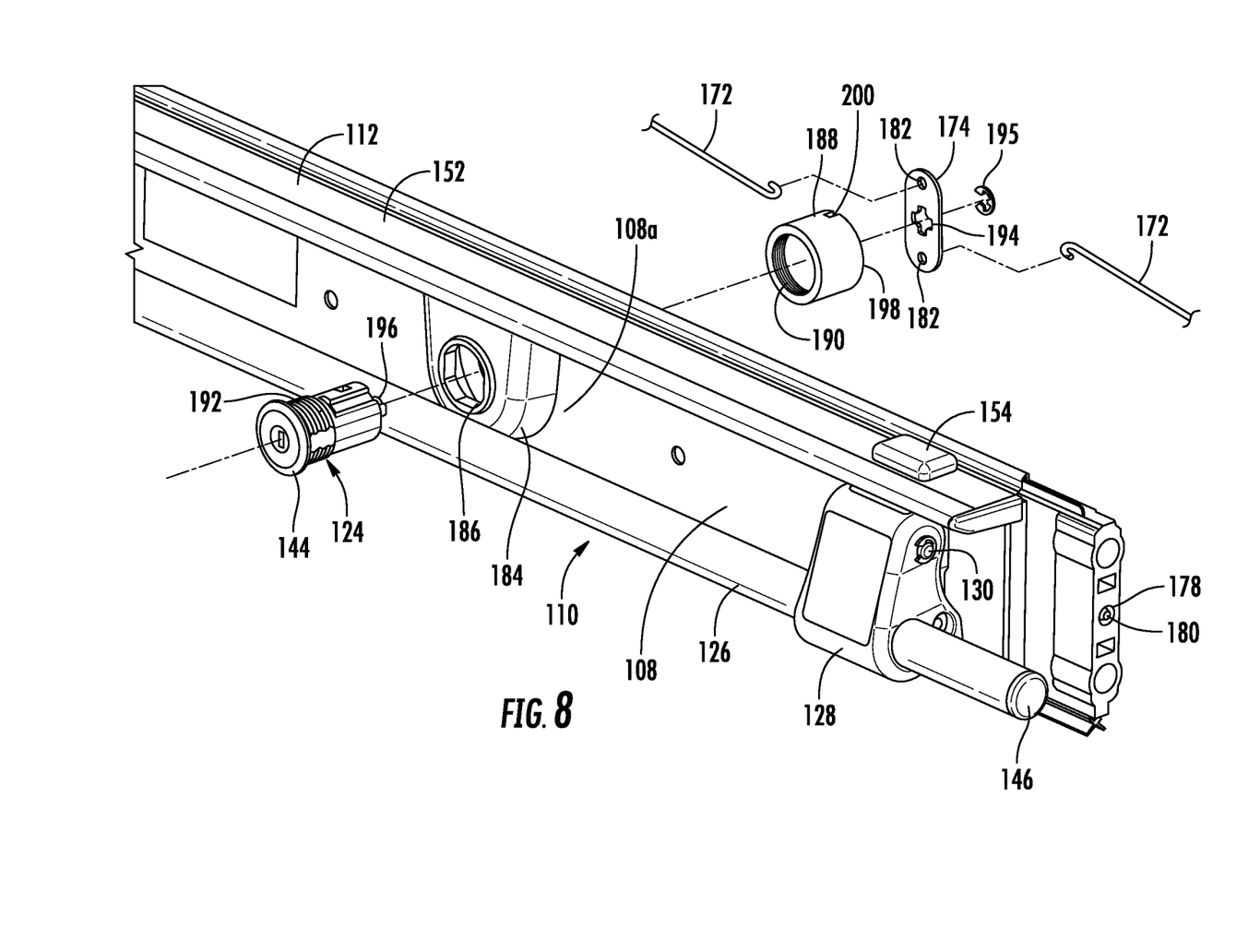
FIG. 8 is a front perspective view of a portion of the locking slat, with the key cylinder and some associated parts in an exploded view arrangement.

FIGS. 6-8 show some specifics as to the mounting of key cylinder 124 to slat 108 and attaching it to the two-point latching assembly 140. As shown therein, key cylinder 124 is attached to locking slat 108 via mounting assembly, including a housing 184 and a fixing member 188. Housing 184 may be formed of an injection-molded plastic, and it defines an opening 186 therethrough for receiving the key cylinder 124. Key cylinder 124 defines a flange 144 on an outer side thereof larger than opening 186 for seating the key cylinder against housing 184.

Threading 192 is located on at least a portion of an exterior of key cylinder 124, and fixing member 188 includes internal threading 190 mating with external threading 192 on key cylinder 124 so that the fixing member can be threaded onto the key cylinder. Fixing member 188 front edge 189 also has a diameter greater than that of opening 186, so that rotating fixing member 188 onto key cylinder 124 eventually compresses the portion of the outer wall 185 of housing 184 between flange 144 of key cylinder 124 and front edge 189 of fixing member 188. Tightened sufficiently, fixing member 188 thereby fixedly mounts key cylinder 124 to housing 184. Housing 184 is itself secured to locking slat 108 by screws 183 driven from the rear/inner side of locking slat 108 (see FIGS. 6 and 7).

As illustrated in FIG. 8, key cylinder 124 is inserted from a front/outer side of locking slat 108 into housing opening 186, and fixing member 188 is inserted from a rear/inner side of locking slat 108, though a passage (opening) 187 through locking slat 108. Note that locking slat 108 is an extrusion with two parallel walls 108a, 108b in the location through key cylinder 124 and fixing member 188 extend, so passage 187 extends through both of the walls there. It should be understood that a unitary, dual-wall structure is not required, and that locking slat could have one wall or could be assembled from more than one parts to create a layered structure of more than one wall. To ensure the strength of locking slat 108 and/or to assist with alignment of parts during installation, passage 187 may be made, as illustrated in FIGS. 6 and 7, just large enough to receive and install fixing member therethrough. However, passage 187 may be made larger (either in both walls 108a, 108b, or only in inner wall 108b) for convenience of installation if desired.

Rear surface 198 of fixing member 188 may include a structure for allowing the fixing member to be driven (rotated) around key cylinder 124 for installation. As shown, two axially-extending slots 200 are provided for such purpose. Use of axially extending slots 200 at rear surface 198 of fixing member 188 avoids issues that would exist with, for example, tightening a common hexagonal nut around key cylinder 124, where a larger passage 187 would be required to such a bolt with a wrench. Use of a fixing member 188 configured with an axial length wherein threading is located forwardly to secure key cylinder 124 but a drive structure such as slots 200 is located rearwardly for tightening the threading also assists with overcoming difficulties of attaching with a conventional hexagonal nut. Slots 200 could be replaced with or supplemented by one or more rear-facing or radially-facing structures to assist with tightening fixing member 188 in place.

Fixing member 188, housing 184, and locking slat 108 are configured so that the fixing member may therefore have an axial length at least as long as a distance between the inner surface of the housing adjacent opening 186 (where the fixing member when installed contacts and compresses the housing) and the inner/rear surface of the locking slat (rear surface of wall part 108b, as illustrated) when the fixing member is positioned to secure the key cylinder to the housing. However, fixing member may have a smaller axial length, such as rearward only to about wall part 108a, or rearward only to about, but not past, wall part 108b. In all cases, fixing member 188 has an axial length substantially greater than that of a typical hexagonal bolt (e.g., ½ inch).

In view of the above, a roll up door assembly is disclosed. The assembly is readily attachable to new OEM door or as an aftermarket replacement door. The assembly is useful with various different types of latching mechanisms. The assembly has particular utility with codeable key cylinders which may be larger in diameter and axial length than conventional key cylinders, but any type of key cylinder can be used with the assembly, including sleeved key cylinders. Driven attachment to the latching mechanism can be accomplished in many ways besides those disclosed above, in effect any fixed, lazy-cam, reopenable, interior openable, electronically latchable or electronic openable, or slammably closeable rotatable member operation com be used with the disclosed assembly. It should be understood that variations and modifications are possible to the embodiments disclosed above, and that the present invention is not limited to such.

We claim:

1. A roll up door assembly mountable in two tracks laterally spaced from one another, each track including a catch, the roll up door assembly comprising:
   a door sized to be mountable and slidable along the tracks between a closed position and an opened position, the door being a roll up door including a plurality of slats extending between the tracks, one of the slats being a locking slat having an outer surface and an inner surface, the inner surface and the outer surface being parallel and being vertical when the door is in the closed position, a passage being defined through the locking slat between the outer surface and the inner surface, the passage being perpendicular to the inner surface and the outer surface and being horizontal when the door is in the closed position;
   a latching assembly attached to the locking slat proximate the inner surface, the latching assembly including a two-point latching system having a rotatable member and two latching members attached to the rotatable member for selectively engaging the catches, the two-point latching system being movable between a latching position and an unlatching position;
   a key cylinder mounted to the locking slat so as to extend through the passage, the key cylinder having a key opening on an outside of the door and being connected to the rotatable member on an inside of the door, the key cylinder selectively rotatable in a first direction and a second direction, the rotatable member of the two-point latching system rotatable with the key cylinder in the first direction to move the latching members from the unlatching position to the latching position, the rotatable member of the two-point latching system movable via rotation of the key cylinder in the second direction to move the latching members from the latching position to the unlatching position, the key cylinder having external threading; and a mounting assembly including a housing and a fixing member, the housing being secured to the outer surface of the locking slat and defining an opening therethrough aligned with the passage, the key cylinder extending through the opening and the passage, the housing defining a first surface on an outer side of the opening and a second surface on an inner side of the opening facing the outer surface of the locking slat, the fixing member being annular with an outer surface, threading on an inner surface, a first end, and a second end, the fixing member threadedly engaging the key cylinder with the first end directly contacting the second surface of the housing and fixing a flange portion of the key cylinder against the first surface of the housing to secure the key cylinder to the housing, the fixing member, the housing, and the locking slat being configured so that the fixing member has an axial length between the first end and the second end at least as long as a distance between the second surface of the housing and the outer surface of the locking slat when the fixing member is positioned to secure the key cylinder to the housing, and wherein the passage is sized radially larger than the fixing member so as to permit an assembly of the fixing member onto the key cylinder while also being sized radially small enough to preclude contact with the outer surface of the fixing member proximate the housing second surface during and after the assembly.

2. The roll up door assembly of claim 1, wherein the fixing member has an axial length at least as long as a distance between the second surface of the housing and the inner surface of the locking slat when the fixing member is positioned to secure the key cylinder to the housing.

3. The roll up door assembly of claim 1, wherein the fixing member has an axial length equal to a distance between the second surface of the housing and the inner surface of the locking slat when the fixing member is positioned to secure the key cylinder to the housing.

4. The roll up door assembly of claim 1, wherein the fixing member second end is configured for axially and drivingly receiving a tool for rotating the fixing member relative to the key cylinder to secure the key cylinder to the housing.

5. The roll up door assembly of claim 4, wherein the rear surface of the fixing member defines two axially-extending slots.

6. The roll up door assembly of claim 1, wherein the rotatable member includes an opening therethrough for drivingly receiving a protrusion extending from a rear of the key cylinder.

7. The roll up door assembly of claim 6, further including a clip mounted in a slot in the protrusion for axially securing the rotatable member to the protrusion.

8. The roll up door assembly of claim 1, wherein the roll up door assembly includes the tracks and the catches.

9. The roll up door assembly of claim 8, wherein the latching assembly includes two rods, each of the rods being attached to the rotatable member and being attached to a respective one of the latches, each of the latches extendable into a respective one of the catches when the door is in a closed position and the latches are in the latching position.

10. The roll up door assembly of claim 1, wherein the key cylinder is a codeable key cylinder.

11. A roll up door assembly mountable in two tracks laterally spaced from one another, each track including a catch, the roll up door assembly comprising:

a door sized to be mountable and slidable along the tracks between a closed position and an opened position, the door being a roll up door including a plurality of slats extending between the tracks, one of the slats being a locking slat having an outer surface and an inner surface, the inner surface and the outer surface being parallel and being vertical when the door is in the closed position, a passage being defined through the locking slat between the outer surface and the inner surface, the passage being perpendicular to the inner surface and the outer surface and being horizontal when the door is in the closed position;

a housing attached to the outer surface of the locking slat, the housing defining an opening therethrough aligned with the passage, the housing defining a first surface on an outer side of the opening and a second surface on an inner side of the opening facing the outer surface of the locking slat;

a key cylinder extending through the passage and the opening, the key cylinder having external threading;

a two-point latching assembly having two latches for selectively engaging the catches and rotatably driven by a rear portion of the key cylinder adjacent the inner surface of the locking slat; and a fixing member threadedly engaging the external threading of the key cylinder to secure the key cylinder to the housing, the fixing member being annular, with a first end, and a second end, and being configured with the housing and the locking slat so that the fixing member has an axial length at least as long as a distance between the second surface of the housing and the outer surface of the locking slat when the fixing member is positioned to secure the key cylinder to the housing, with the first end directly contacting the second surface of the housing, wherein the passage is sized radially larger than the fixing member so as to permit an assembly of the fixing member onto the key cylinder while also being sized radially small enough to preclude contact with an outer surface of the fixing member proximate the housing second surface during and after the assembly.

12. The roll up door assembly of claim 11, wherein the fixing member has an axial length at least as long as a distance between the second surface of the housing and the inner surface of the locking slat when the fixing member is positioned to secure the key cylinder to the housing.

13. The roll up door assembly of claim 11, wherein the fixing member has an axial length equal to a distance between the second surface of the housing and the inner surface of the locking slat when the fixing member is positioned to secure the key cylinder to the housing.

14. The roll up door assembly of claim 11, wherein the fixing member has a rear surface configured non-annularly for drivingly receiving a tool for rotating the fixing member relative to the key cylinder to secure the key cylinder to the housing.

15. The roll up door assembly of claim 14, wherein the rear surface of the fixing member defines two axially-extending slots.

16. The roll up door assembly of claim 11, further including a clip mounted in a slot in a protrusion at the rear of the key cylinder axially securing a rotatable member of the two-point latching assembly to the protrusion.

17. The roll up door assembly of claim 11, wherein the roll up door assembly includes the tracks and the catches.

18. The roll up door assembly of claim 17, wherein the two-point latching assembly includes two rods, each of the rods being attached to a rotatable member rotatable with the key cylinder and being attached to a respective one of the latches, each of the latches extendable into a respective one of the catches when the door is in a closed position and the latches are in the latching position.

19. The roll up door assembly of claim 11, wherein the key cylinder is a codeable key cylinder.

\* \* \* \* \*